US007963360B2

(12) United States Patent
Johnson et al.

(10) Patent No.: US 7,963,360 B2
(45) Date of Patent: Jun. 21, 2011

(54) RATCHET RESET MECHANISM

(75) Inventors: Nancy L. Johnson, Northville, MI (US);
Alan L. Browne, Grosse Pointe, MI (US); Kenneth A. Strom, Washington, MI (US); Diann Brei, Milford, MI (US); Brian M. Barnes, Ypsilanti, MI (US); Jonathan E. Luntz, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 757 days.

(21) Appl. No.: 12/044,104

(22) Filed: Mar. 7, 2008

(65) Prior Publication Data
US 2008/0223158 A1 Sep. 18, 2008

Related U.S. Application Data

(60) Provisional application No. 60/895,271, filed on Mar. 16, 2007.

(51) Int. Cl.
*G05G 5/05* (2006.01)
*G05G 5/06* (2006.01)
*G05G 5/18* (2006.01)
*G05G 5/24* (2006.01)

(52) U.S. Cl. .................... 180/274; 296/187.04; 74/535; 74/577 M

(58) Field of Classification Search .................. 180/274; 296/187.04; 74/535, 575, 576, 577 R, 577 S, 74/577 SF, 577 M, 578; G05G 5/05, 5/06, G05G 5/18, 5/24
See application file for complete search history.

(56) References Cited

U.S. PATENT DOCUMENTS

| 4,854,187 A * | 8/1989 | Walters ........................... 74/535 |
| 2006/0145544 A1 | 7/2006 | Browne et al. |
| 2007/0068721 A1 | 3/2007 | Browne et al. |

FOREIGN PATENT DOCUMENTS

| DE | 43 29 163 A1 | 3/1995 |
| DE | 199 20 436 A1 | 11/2000 |
| DE | 10 2004 011 054 A1 | 12/2004 |

* cited by examiner

*Primary Examiner* — Paul N Dickson
*Assistant Examiner* — Keith Frisby
(74) *Attorney, Agent, or Firm* — Quinn Law Group, PLLC

(57) ABSTRACT

A ratchet apparatus includes a first member, a rack, and a second member that is selectively movable in first and second directions with respect to the first member. A first pawl is mounted with respect to the first member and is biased into engagement with the rack. The first pawl and the rack are configured such that engagement of the first pawl with the rack prevents movement of the first pawl relative to the rack in the first direction. A second pawl is mounted with respect to the second member for movement therewith in the first and second directions. The second pawl is biased into engagement with the rack. The second pawl and said rack are configured such that engagement of the second pawl with the rack prevents movement of the second pawl relative to the rack in the first direction.

7 Claims, 9 Drawing Sheets

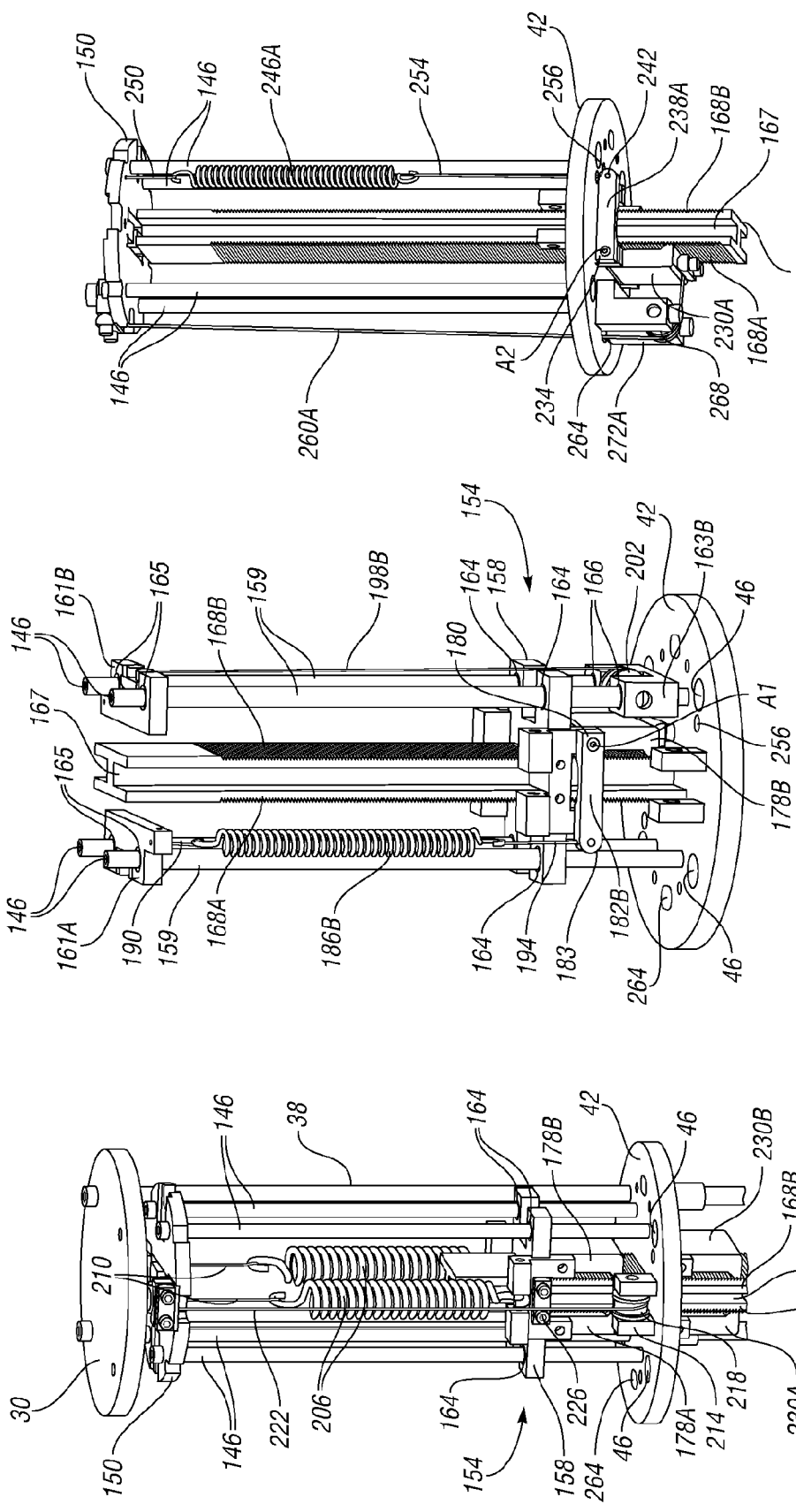

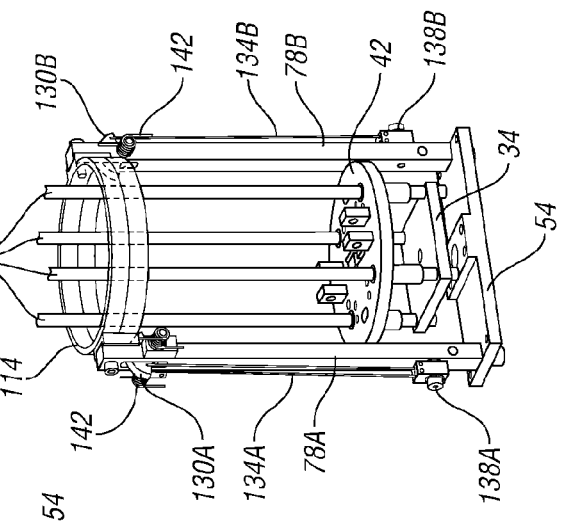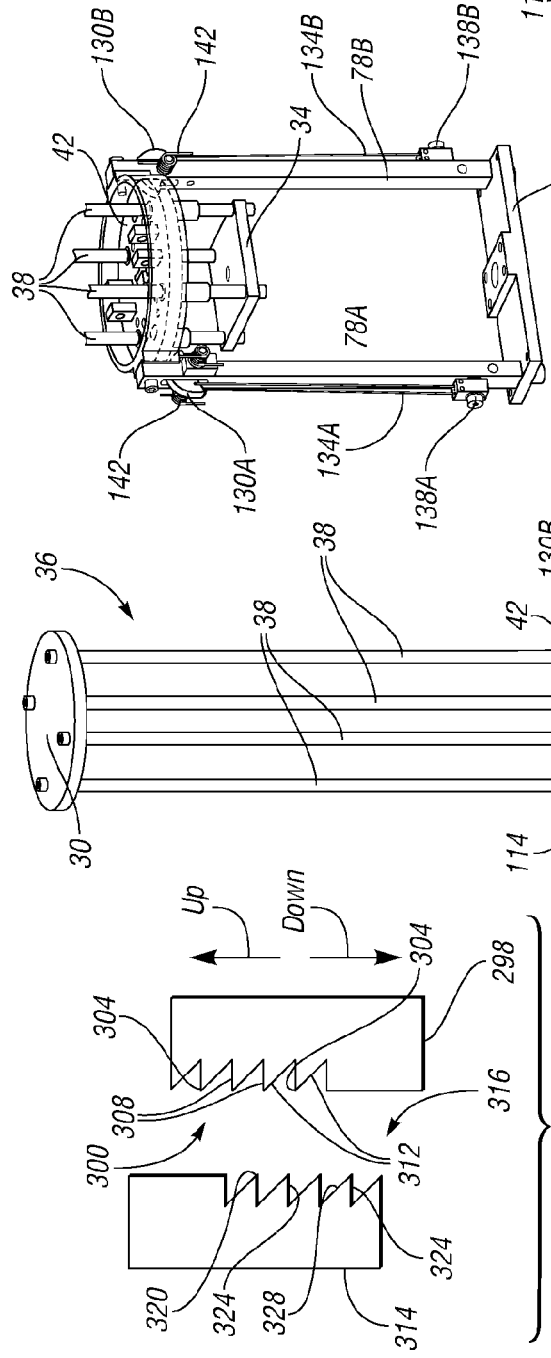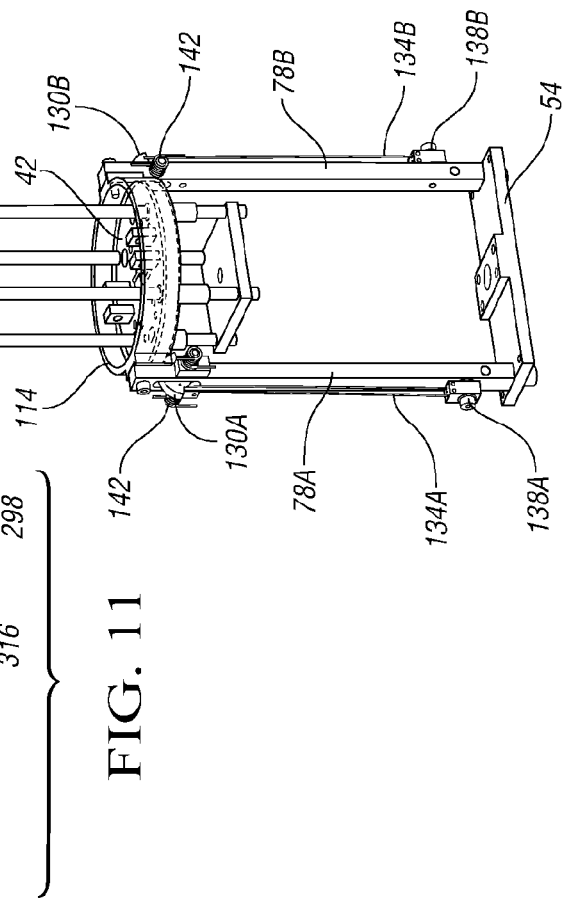
FIG. 11
FIG. 12
FIG. 13
FIG. 14

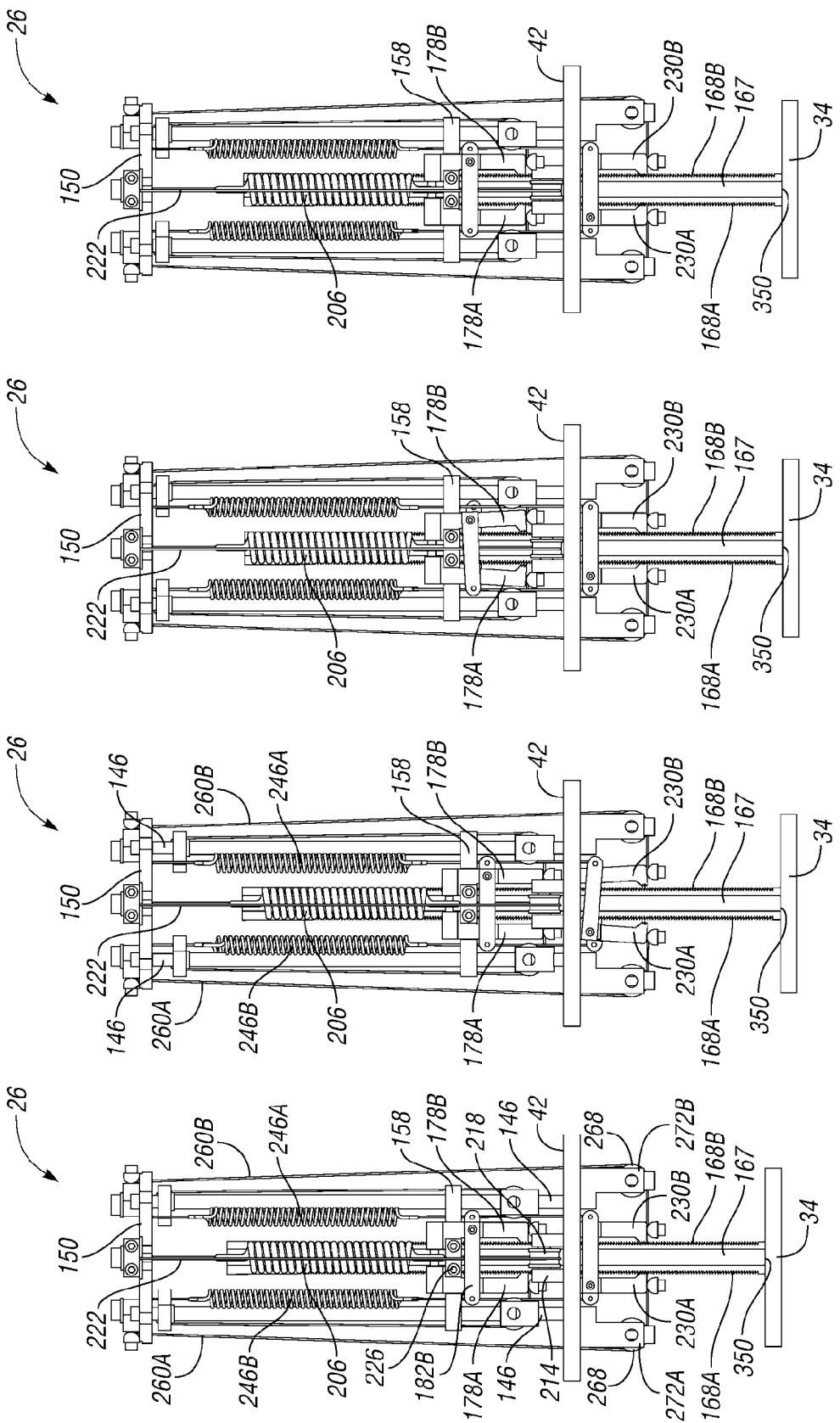

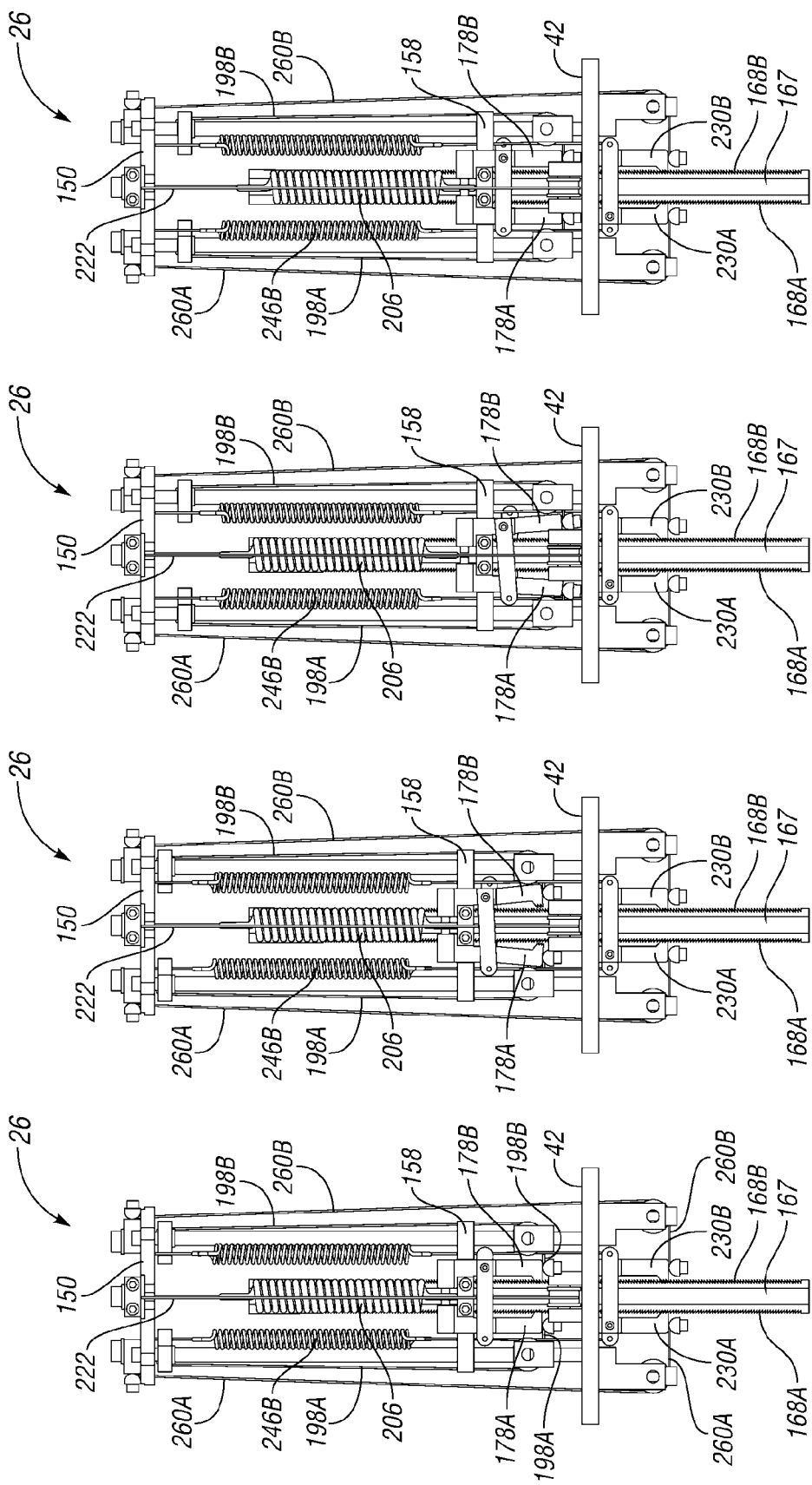

US 7,963,360 B2

RATCHET RESET MECHANISM

CROSS REFERENCE TO RELATED APPLICATION

This application claims the benefit of U.S. Provisional Patent Application No. 60/895,271, filed Mar. 16, 2007, which is hereby incorporated by reference in its entirety.

TECHNICAL FIELD

This invention relates to ratchets that are actuatable by active materials.

BACKGROUND OF THE INVENTION

Active materials include those compositions that exhibit a change in stiffness properties, shape and/or dimensions in response to an activation signal, which can be an electrical, magnetic, thermal or a like field depending on the different types of active materials. Shape memory materials, a class of active materials, have the ability to reverse psuedo-plastic strain and return to a predetermined shape in response to an external stimulus (i.e., an activation signal). Accordingly, deformation of the shape memory material from the predetermined, original shape can be a temporary condition.

SUMMARY OF THE INVENTION

A ratchet apparatus includes a first member, a rack that is selectively movable with respect to the first member in first and second directions and that has a surface, and a second member that is selectively movable in the first and second directions with respect to the first member. A first pawl is mounted with respect to the first member and is biased into engagement with the surface of the rack. The first pawl and the rack are configured such that engagement of the first pawl with the surface prevents movement of the first pawl relative to the rack in the first direction and permits movement of the first pawl relative to the rack in the second direction.

A second pawl is mounted with respect to the second member for movement therewith in the first and second directions. The second pawl is biased into engagement with the surface of the rack. The second pawl and the rack are configured such that engagement of the second pawl with the surface prevents movement of the second pawl relative to the rack in the first direction and permits movement of the second pawl relative to the rack in the second direction.

The ratchet assembly provides incremental displacement between the rack and the members as a result of relative movement of the members, and thereby enables large displacement between the rack and the members as a result of active material actuation.

The ratchet assembly is usable as a reset mechanism for a spring-based actuator. Accordingly, an actuator assembly is provided that includes a frame and an extension member that has a first end and a second end and that is selectively movable with respect to the frame between a retracted position and an extended position. The actuator assembly also includes a base member that is operatively connected to the extension member for selective translation with respect to the extension member, and that is selectively movable between a first position and a second position with respect to the frame.

A first latch is configured to selectively engage the second end of the extension member to retain the extension member in the retracted position with respect to the frame. A second latch is configured to selectively engage the base member to retain the base member in the first position with respect to the frame. A spring is between the first end of the extension member and the base member. The spring is compressed and urges the first end and the base member apart when the extension member is in the retracted position and the base member is in the first position.

The actuator assembly is selectively movable between a first configuration in which the extension member is in the retracted position and the base member is in the first position, a second configuration in which the extension member is in the extended position and the base member is in the first position, and a third configuration in which the extension member is in the retracted position and the base member is in the second position. The actuator assembly further includes a ratchet mechanism that is configured to selectively move the actuator from the third configuration to the first configuration by moving the base member from the second position to the first position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a schematic, perspective view of a portion of the ratchet reset mechanism of FIG. 7;

FIG. 9 is a schematic, perspective view of a portion of the ratchet reset mechanism of FIG. 7;

FIG. 10 is a schematic, perspective view of a portion of the ratchet reset mechanism of FIG. 7;

FIG. 11 is a schematic side view of a portion of a rack and a portion of a pawl that are representative of the rack and pawls of the ratchet reset mechanism of FIG. 7;

FIG. 12 is a schematic, perspective view of the extension member in an extended position;

FIG. 13 is another schematic, perspective view of the extension member in the extended position;

FIG. 14 is a schematic, perspective view of the extension member in the retracted position and the base member in a second position;

FIG. 15 is a schematic, side view of the ratchet reset mechanism of FIG. 7 with a ratchet member in a first position with respect to the base member;

FIG. 16 is a schematic, side view of the ratchet reset mechanism of FIG. 7 with the ratchet member moving to a second position with respect to the base member and the lower pawls ratcheting with respect to a rack;

FIG. 17 is a schematic, side view of the ratchet reset mechanism of FIG. 7 with the ratchet member moving to the first position from the second position of FIG. 16, with the upper pawls ratcheting with respect to the rack;

FIG. 18 is a schematic, side view of the ratchet reset mechanism of FIG. 7 with the rack moved from its position shown in FIG. 15 as a result of the movements depicted in FIGS. 16 and 17;

FIG. 19 is a schematic, side view of the ratchet reset mechanism of FIG. 7 with a ratchet member in a first position with respect to the base member;

FIG. 20 is a schematic, side view of the ratchet reset mechanism of FIG. 7 with the upper pawls disengaged from the rack;

FIG. 21 is a schematic, side view of the ratchet reset mechanism of FIG. 7 with the ratchet member moving to the second position with respect to the base member while the upper pawls are disengaged from the rack;

FIG. 22 is a schematic, side view of the ratchet reset mechanism of FIG. 7 with the ratchet member in the second position with respect to the base member with the upper pawls engaged with the rack;

DESCRIPTION OF THE PREFERRED EMBODIMENTS

Figure 1:
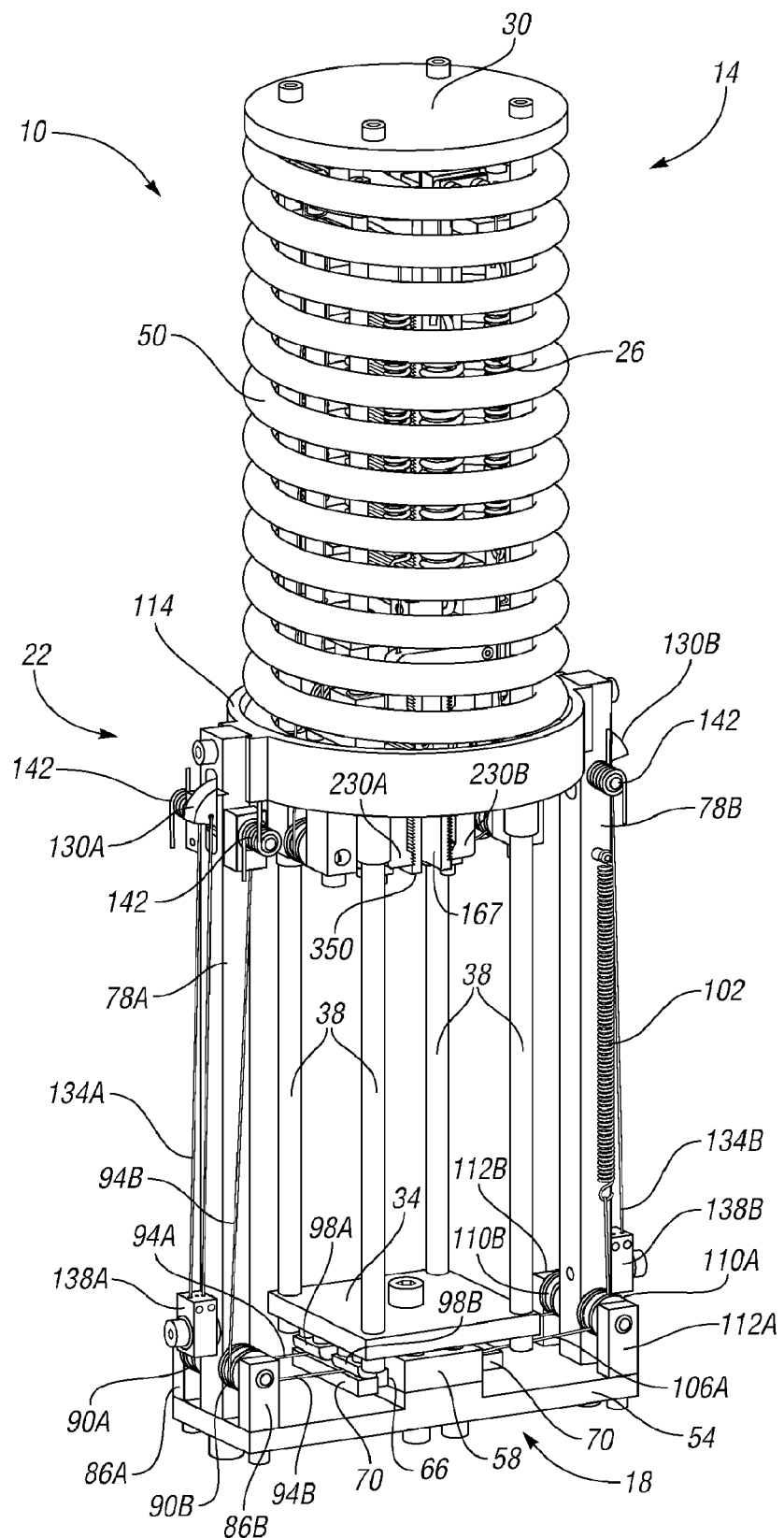
FIG. 1 is a schematic, perspective view of a spring-based actuator assembly having an extension member in a retracted position.

Referring to FIG. 1, an actuating device 10 is schematically depicted. The actuator assembly 10 may be employed to selectively displace (raise, lower, rotate, etc.) an object. In an exemplary embodiment, the actuator assembly 10 is employed to selectively move an automotive body panel, such as a hood. The device 10 is comprised of a plurality of subsystems, namely, a lift subsystem 14, a release subsystem 18, a lower subsystem 22, and a reset subsystem 26.

Figure 2:
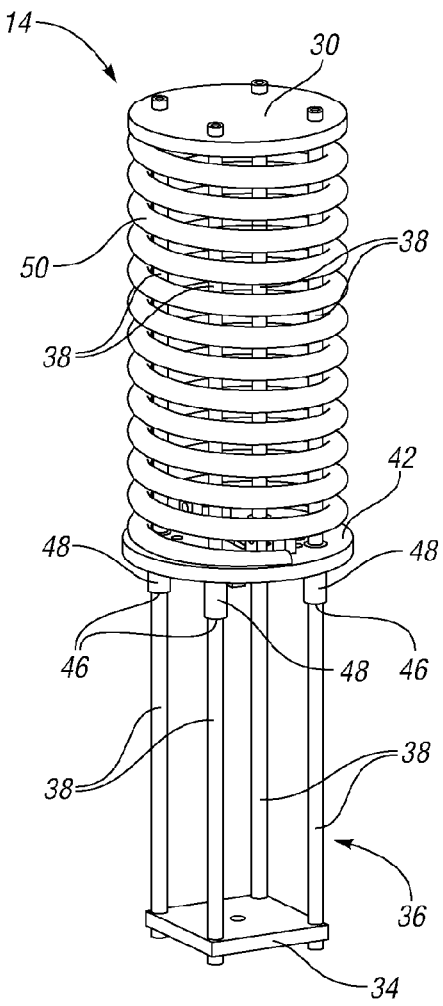
FIG. 2 is a schematic, perspective view of the extension member of the actuator assembly of FIG. 1.

Referring to FIGS. 1 and 2, the lift subsystem 14 includes a top plate 30 and a bottom plate 34 rigidly interconnected by four support posts 38. The support posts 38 are spaced a distance apart from one another and are substantially parallel with one another. A base plate 42 is disposed between the top plate 30 and the bottom plate 34. The top plate 30, support posts 38, and the bottom plate 34 define an extension member 36, with the top plate 30 defining one end of the extension member 36, and the bottom plate 34 defining another end of the extension member 36. The base plate 42 also defines four apertures 46; each of the support posts 38 extends through a respective one of the apertures 46 so that the base plate 42 is selectively slidable along the posts 38, and thus the posts 38 and the base plate 42 are translatable relative to one another. An energy storage device, namely spring 50, surrounds the posts 38; one end of the spring 50 contacts the top plate 30 and the other end of the spring 50 contacts the base plate 42. Those skilled in the art will recognize a variety of spring configurations that may be employed within the scope of the claimed invention, such as gas springs, coil springs, etc. The base plate 42 preferably includes cylindrical portions 48 that at least partially define the holes 46 to stabilize the plate 42 during translation along the posts 38.

Figure 3:
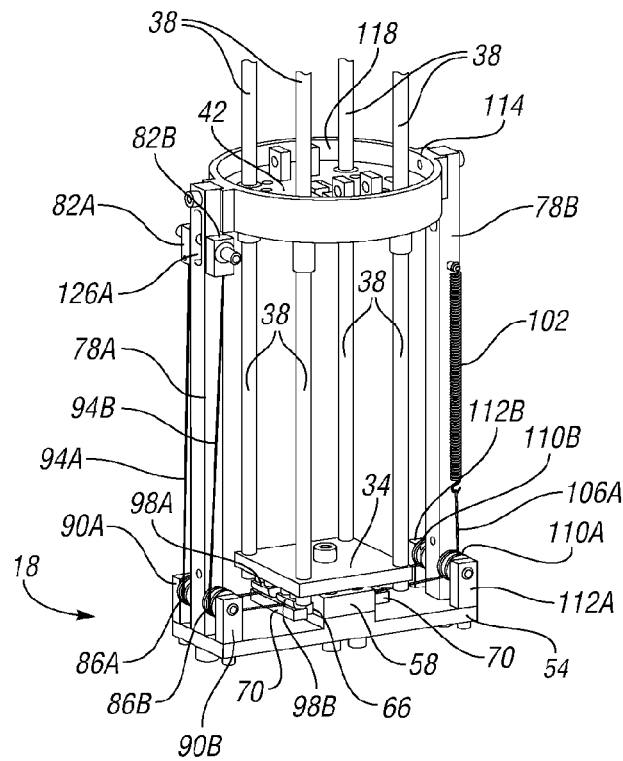
FIG. 3 is a schematic, perspective view of the extension member engaging a first latch in the retracted position.
Figure 4:
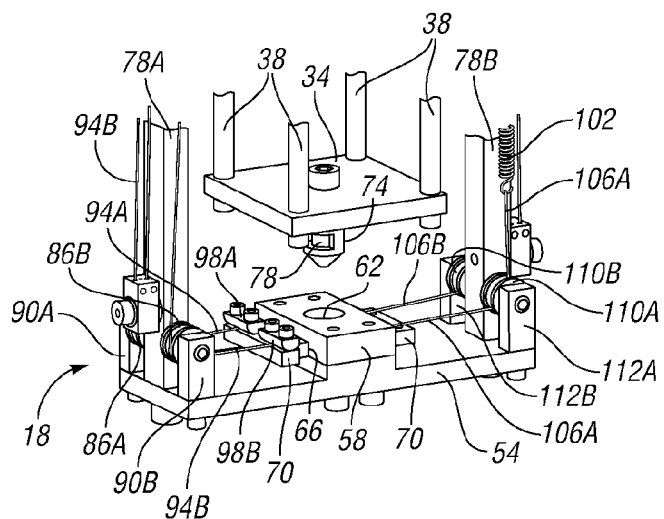
FIG. 4 is a schematic, perspective view of the extension member disengaged from the first latch.

Referring to FIGS. 1, 3, and 4, the release subsystem 18 includes a ground plate 54 having a latch block 58 mounted thereto. The latch block 58 defines a hole 62 that is open in the direction of the bottom plate 34. The latch block 58 and the ground plate 54 cooperate to define a slot 66. A latch plate 70 is slidably disposed within the slot 66 for movement between a latched position and an unlatched position. The lift subsystem 14, including the bottom plate 34, is selectively movable with respect to the ground plate 54 and the latch block 58 such that a latch post 74, which is mounted to the bottom plate 34, is movable into and out of the hole 62. When the latch plate 70 is in the latched position (and the post 74 is within the hole 62), the latch plate 70 engages a slot 78 on the latch post 74 to retain the latch post 74 within the hole 62, and thereby to connect the bottom plate 34 to the latch block 58, as shown in FIGS. 1 and 3. When the latch plate 70 is moved from the latched position to the unlatched position, the latch plate 70 disengages the post 74 to permit the movement of the post 74 and the bottom plate 34 away from the latch block 58, as shown in FIG. 4.

The release subsystem 18 also includes two separator bars 78A, 78B mounted to opposite sides of the ground plate 54. The separator bars 78A, 78B at least partially define a frame. Bar 78A supports two screw crimps 82A, 82B. The release subsystem 18 also includes two electrically isolated bearings 86A, 86B adjacent the ground plate 54. The bearings 86A, 86B are rotatably supported by bearing supports 90A, 90B mounted to the ground plate 54. The release subsystem 18 also includes two flexible shape memory alloy (SMA) members 94A, 94B. Member 94A is mounted to the separator bar 78A by crimp 82A, engages bearing 86A, and is mounted by a band crimp 98A to the latch plate 70. Similarly, SMA member 94B is mounted to the separator bar 78B by crimp 82B, engages bearing 86B, and is mounted by a band crimp 98B to the latch plate 70. It should be noted that bearings used in the actuator assembly 10 are electrically isolated. SMA member mounts (e.g., band crimps and screw crimps) are also electrically isolated.

The release subsystem 18 also includes two springs, only one of which is shown in the Figures at 102, that bias the latch plate 70 in the latched position. More specifically, spring 102 is operatively connected to the bar 78B at one end, and to a flexible member 106A at the other end. The member 106A, which is guided by a bearing 110A, is mounted to the latch plate 70. Similarly, the other spring (not shown) is operatively connected to the bar 78B at one end, and to a flexible member 106B at the other end. The member 106B, which is guided by a bearing 110B, is mounted to the latch plate 70. Members 106A, 106B are electrically isolating, and may, for example, be comprised of Kevlar. Each bearing 110A, 110B is rotatably supported between the bar 78A and a respective one of bearing supports 112A, 112B. The springs 102 bias the latch plate 70 in its latched position.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of the alloy may be characterized by a predetermined shape. When the object is pseudo-plastically deformed from its predetermined shape in the cold state, the strain may be reversed by heating the object above its austenite finish temperature $A_f$, i.e., heating the object above its $A_f$ will cause the object to return to its predetermined shape. An SMA's modulus of elasticity and yield strength are also significantly lower in the cold state than in the hot state. As understood by those skilled in the art, pseudo-plastic strain is similar to plastic strain in that the strain persists despite removal of the stress that caused the strain. However, unlike plastic strain, pseudo-plastic strain is reversible when the object is heated to its hot state.

The members 94A, 94B are characterized by a predetermined length (shape), and are configured such that they are characterized by tensile strain when the latch plate 70 is in its latched position, and are thus longer than their predetermined length. When the members 94A, 94B are heated to the hot state, they decrease in length to their predetermined length, thereby causing the latch plate 70 to move to its unlatched position and inducing tensile elastic strain in the springs 102. When the members 94A, 94B cool to the cold state, the modulus and yield strength of the members 94A, 94B are sufficiently low so that force exerted by the springs 102 is sufficient to deform the members 94A, 94B and return the latch plate 70 to its latched position.

Figure 5:
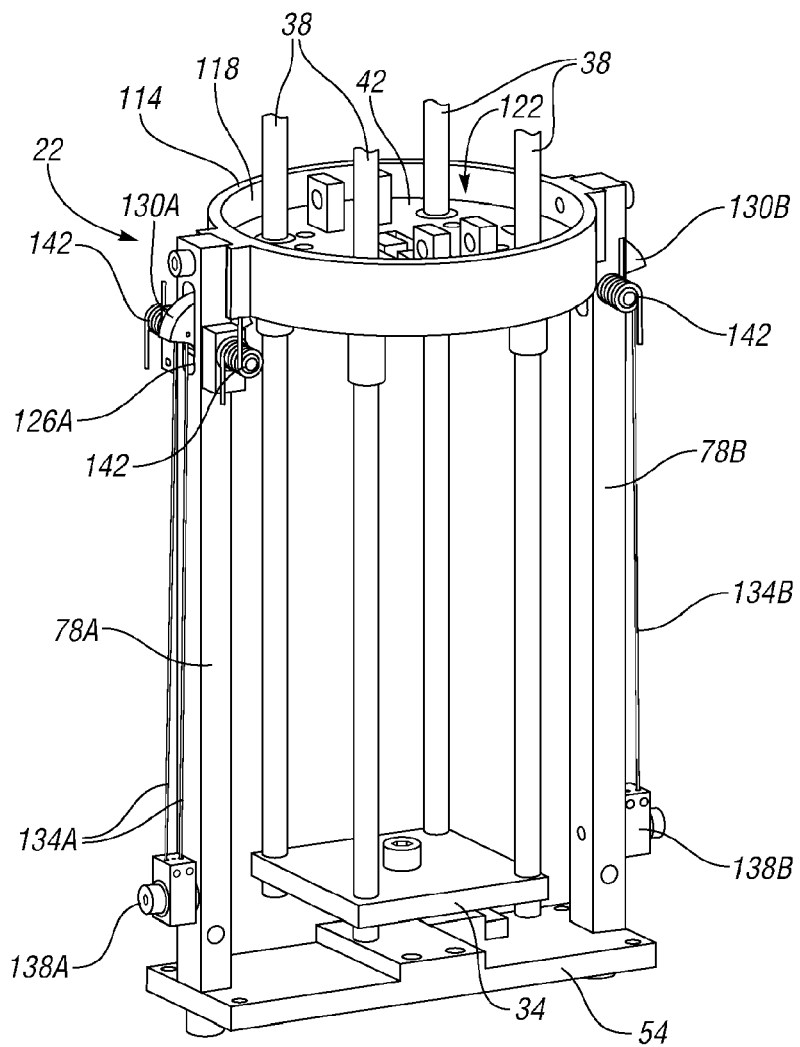
FIG. 5 is a schematic, perspective view of a base member of the actuator assembly of FIG. 1 in a first position and engaging a second latch.
Figure 6:
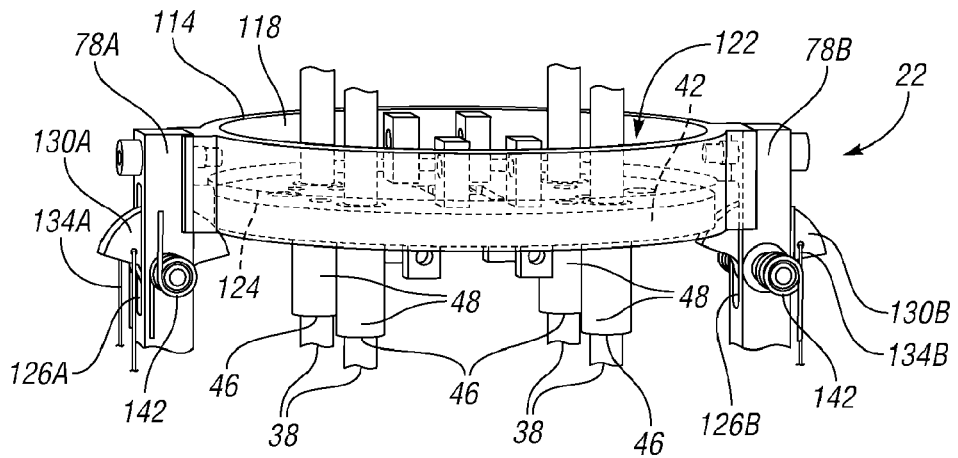
FIG. 6 is another schematic, perspective view of the base member engaging the second latch.

Referring to FIGS. 1, 5, and 6, the lower subsystem 22 is schematically depicted. An annular member 114 operatively interconnects the separator bars 78A, 78B to provide structural rigidity to the actuator assembly 10. The annular member 114 is characterized by an inner surface 118 that defines a cylindrical space 122. The inner surface 118 is characterized by a ridge 124. The inner surface 118 surrounds the support posts 38, and the cylindrical space 122 below the ridge 124 is sufficiently sized to permit the base plate 42 to enter the cylindrical space 122. Ridge 124 is sufficiently positioned to limit upward movement of the base plate 42 through the space 122 through physical part interference with the base plate 42.

Bar 78A defines a slot 126A adjacent the annular member 114. A crescent latch 130A is rotatably mounted to the bar 78A such that at least part of the latch 130A extends through the slot 126A. An SMA member 134A is mounted to the bar 78A at both ends by an electrically isolated screw crimp 138A. The SMA member 134A defines a loop that extends through a hole in the latch 130A such that the member 134A is operatively connected to the latch 130A. The latch 130A is rotatable between a latched position and an unlatched position. Two torsion springs 142 are operatively connected to the bar 78A and the latch 130A to bias the latch 130A into the latched position. When the latch 130A is in the latched position, the SMA member 134A is characterized by tensile strain, and is thus longer than its predetermined length. Heating the member 134A to its hot state causes the member 134A to decrease in length to its predetermined length, thereby rotating the latch 130A to its unlatched position and inducing elastic strain in the springs 142. When the member 134A cools to its cold state, the modulus and yield strength of the member 134A are sufficiently low so that force exerted by the springs 142 is sufficient to deform the member 134A and return the latch 130A to its latched position.

Similarly, bar 78B defines a slot 126B adjacent the annular member 114. A crescent latch 130B is rotatably mounted to the bar 78B such that at least part of the latch 130B extends through the slot 126B. An SMA member 134B is mounted to the bar 78B at both ends by an electrically isolated screw crimp 138B. The SMA member 134B defines a loop that extends through a hole in the latch 130B such that the member 134B is operatively connected to the latch 130B. The latch 130B is rotatable between a latched position and an unlatched position. Two torsion springs 142 are operatively connected to the bar 78B and the latch 130B to bias the latch 130B into the latched position. When the latch 130B is in the latched position, the SMA member 134B is characterized by tensile strain, and is thus longer than its predetermined length. Heating the member 134B to its hot state causes the member 134B to decrease in length to its predetermined length, thereby rotating the latch 130B to its unlatched position and inducing elastic strain in the springs 142. When the member 134B cools to its cold state, the modulus and yield strength of the member 134B are sufficiently low so that force exerted by the springs 142 is sufficient to deform the member 134B and return the latch 130B to its latched position.

In their latched positions, latches 130A, 130B extend into the path of the base plate 42 between the separator bars 78A, 78B; in their unlatched state, latches 130A, 130B do not extend into the path of the base plate 42. Each of the latches 130A, 130B is characterized by a cam profile that acts as a wedge to hold the base plate 42 firmly against the ridge 124 in surface 118 of annular member 114 when the latches 130A, 130B are in their latched positions.

Referring to FIGS. 7-10, wherein like reference numbers refer to like components from FIGS. 1-6, the reset subsystem 26 includes four parallel support posts 146 that are mounted to, and extend between, the base plate 42 and a crimp plate 150. A carriage assembly 154 includes a carriage member 158 (also sometimes referred to herein as a "ratchet member"), four spacer sheaths (shown at 159 in FIGS. 7 and 9), two mounts (shown at 161A, 161B in FIGS. 7 and 9) and two bearing carriages 163A, 163B. Each of the four spacer sheaths 159 concentrically surrounds, and is selectively slidable upward and downward along, a respective one of the four posts 146. The spacer sheaths 159 operatively interconnect the carriage member 158, mounts 161A, 161B, and bearing carriages 163A, 163B for selective unitary translation along the posts 146.

More specifically, the carriage member 158 defines four holes 164 through which a respective one of the four posts 146 and sheaths 159 extend such that the carriage member 158 is selectively slidable along the posts 146 with the sheaths 159. Similarly, each of the two mounts 161A, 161B defines two holes 165 through which a respective post 146 extends, and into which a respective sheath 159 extends so that the mounts 161A, 161B are selectively slidable along the posts 146 with the sheaths 159. Each of the two bearing carriages 163A, 163B defines two holes 166 through which a respective post 146 extends, and into which a respective sheath 159 extends so that the bearing carriages 163A, 163B are selectively slidable along the posts 146 with the sheaths 159. The mounts 161A, 161B are adjacent the crimp plate 150, and the bearing carriages 163A, 163B are adjacent the base plate 42. The carriage member 158 is between the mounts 161A, 161B and the bearing carriages 163A, 163B. The sheaths 159 are sufficiently connected to the carriage member 158, the bearing carriages 163A, 163B, and the mounts 161A, 161B such that the distances between the carriage member 158, bearing carriages 163A, 163B, and the mounts 161A, 161B are maintained during the operation of the actuator assembly 10.

The reset subsystem 26 also includes an I-beam shaped rack 167 that extends through an opening in the base plate 42 and an opening in the carriage member 158 for selective translation in the up and down directions. The rack 167 defines two surfaces 168A, 168B that face opposite directions that are normal to the directions of translation of the rack 167. It should be noted that, as used herein, "up" and related words, such as "top," "upper" and "above," merely refer to the orientation of the actuator assembly 10 in the Figures, and are not intended to limit the orientation or arrangement of the actuator assembly 10 or any of its component parts within the scope of the claimed invention. Similarly, "down" and related words, such as "lower," "bottom," and "below," refer to the direction opposite "up" and are not intended to limit the orientation or arrangement of the actuator assembly 10 or any of its component parts.

The carriage assembly 154 includes two upper pawls (shown at 178A, 178B in FIGS. 7 and 8) that are pivotably mounted to the carriage member 158. Pawl 178A is selectively pivotable between an engaged position in which the pawl 178A contacts surface 168A of the rack 167, and a disengaged position in which the pawl 178A does not contact surface 168A of the rack 167. Similarly, pawl 178B is selectively pivotable between an engaged position in which the pawl 178B contacts surface 168B of the rack 167, and a disengaged position in which the pawl 178B does not contact surface 168B of the rack 167.

Referring specifically to FIG. 9, one end 180 of a pawl bar 182B is rigidly pinned to the pawl 178B for rotation therewith about axis A1. The other end 183 of the pawl bar 182B is operatively connected to mount 161A via a spring 186B such that the spring 186B biases the pawl 178B into its engaged position. More specifically, spring 186B is connected to the mount 161A via tether 190, e.g., Kevlar, and is connected to the pawl bar 182B via tether 194, and urges the end 183 of the pawl bar 182B upward, thereby inducing a moment about axis A1, which urges the pawl 178B toward the engaged position.

An SMA member 198B is mounted at one end to mount 161B, engages a bearing 202 rotatably connected to bearing carriage 163B, and is mounted at the other end to pawl 178B. When the pawl 178B is in the engaged position, the SMA member 198B is characterized by tensile strain, and is thus longer than its predetermined length. Heating the member 198B to its hot state causes the member 198B to decrease in length to its predetermined length, thereby rotating the pawl 178B about axis A1 to its disengaged position and inducing tensile elastic strain in the spring 186B. When the member 198B cools to its cold state, the modulus and yield strength of the member 198B are sufficiently low so that force exerted by the spring 186B is sufficient to deform the member 198B and return the pawl 178B to its engaged position.

Referring again to FIG. 7, pawl 178A is similarly biased toward its engaged position by a spring (not shown). An SMA member 198A is mounted at one end to mount 161A, engages a bearing 202 rotatably connected to bearing carriage 163A, and is mounted at the other end to pawl 178A. When the pawl 178A is in the engaged position, the SMA member 198A is characterized by tensile strain, and is thus longer than its predetermined length. Heating the member 198A to its hot state causes the member 198A to decrease in length to its predetermined length, thereby rotating the pawl 178A to its disengaged position and inducing tensile elastic strain in the spring that biases the pawl 178A toward its engaged position. When the member 198A cools to its cold state, the modulus and yield strength of the member 198A are sufficiently low so that force exerted by the spring is sufficient to deform the member 198A and return the pawl 178A to its engaged position.

Reset springs 206 are mounted at one end to the carriage member 158, and are mounted to the crimp plate 150 via a respective tether 210 at the other end. Base plate 42 includes bearing bracket 214 at which a bearing 218 is rotatably connected to the base plate 42. An SMA member 222 is mounted to the crimp plate 150 at one end, engages the bearing 218, and is mounted to the carriage member 158 at the other end by a crimp 226. The reset springs 206 bias the carriage member 158 in a first position with respect to the base plate 42. Heating member 222 to its hot state causes the member to contract; since the bearing 218 is positioned below the two mounting points of the member 222, i.e., the crimp plate 150 and the carriage member 158, contraction of the member 222 urges the base plate 42 upward and the carriage member 158 downward (i.e., toward each other) so that the carriage member 158 is moved to a second position with respect to the base plate 42, causing tensile elastic strain in the reset springs 206.

When the member 222 cools to its cold state, its modulus and yield strength are sufficiently low so that the springs 206 deform the member 222 and cause the carriage member 158 and the base plate 42 to move apart, i.e., so that the carriage member 158 is in the first position relative to the base plate 42. A member (not shown) similar to member 222 is also mounted to the crimp plate 150 and the carriage member 158 via a bearing (not shown) on the opposite side of the reset subsystem 26.

The reset subsystem 26 also includes two lower pawls 230A, 230B that are pivotably mounted to the base plate 42. Pawl 230A is selectively pivotable between an engaged position in which the pawl 230A contacts surface 168A of the rack 167, and a disengaged position in which the pawl 230A does not contact surface 168A of the rack 167. Similarly, pawl 230B is selectively pivotable between an engaged position in which the pawl 230B contacts surface 168B of the rack 167, and a disengaged position in which the pawl 230B does not contact surface 168B of the rack 167.

Figure 7:
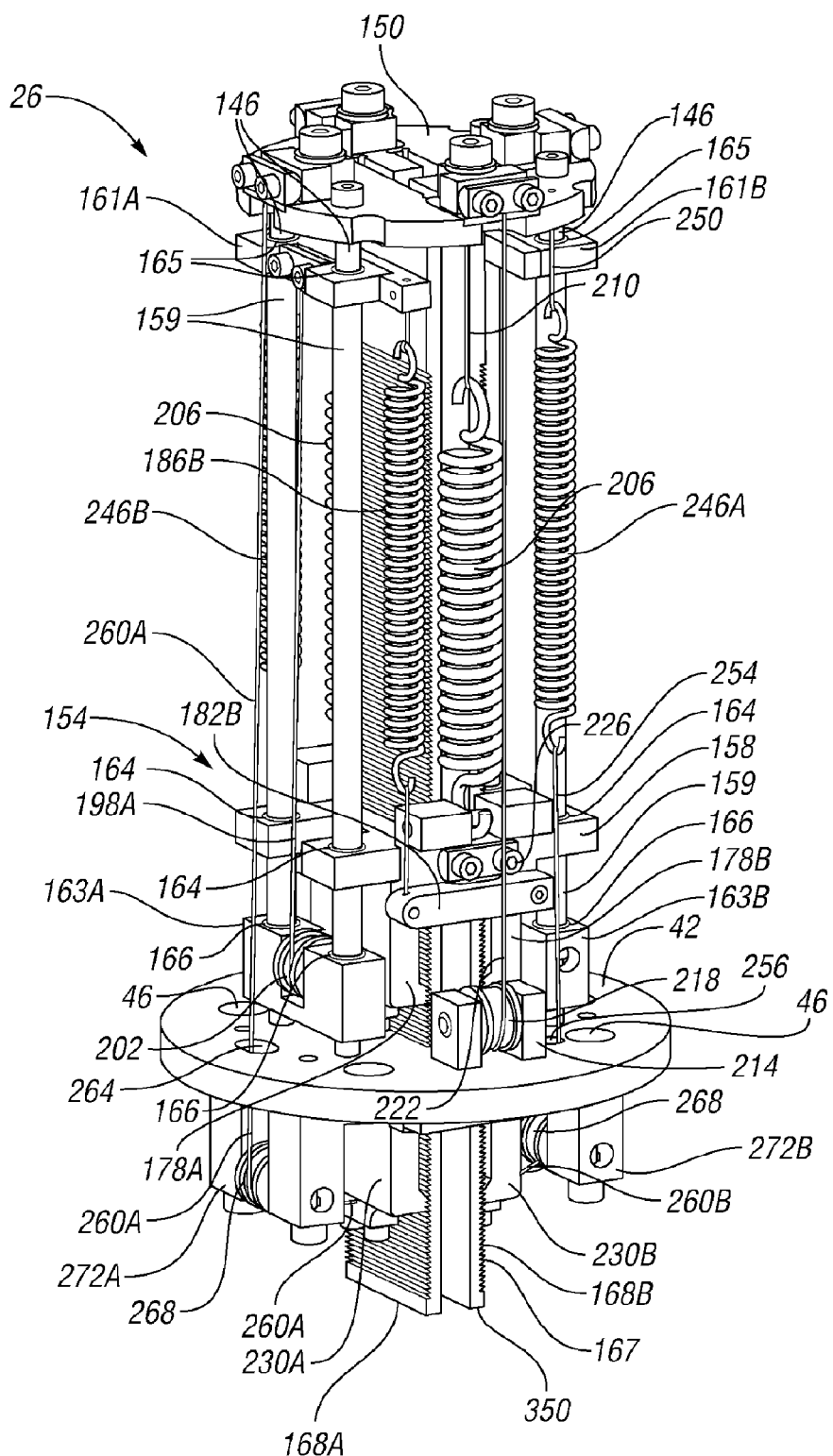
FIG. 7 is a schematic, perspective view of a ratchet reset mechanism of the actuator assembly of FIG. 1, the ratchet reset mechanism including a ratchet member, upper pawls operatively connected to the ratchet member, and lower pawls operatively connected to the base member.

Referring to FIGS. 7 and 10, one end 234 of a pawl bar 238A is rigidly pinned to the pawl 230A for rotation therewith about axis A2. The other end 242 of the pawl bar 238A is operatively connected to crimp plate 150 via a spring 246A such that the spring 246A biases the pawl 230A into its engaged position. More specifically, spring 246A is connected to the crimp plate 150 via tether 250, and is connected to the pawl bar 238A via tether 254 and urges the end 242 of the pawl bar 238A upward, thereby inducing a moment about axis A2, which urges the pawl 230A toward the engaged position. Since the pawl 230A and the pawl bar 238A are on the opposite side of the base plate 42 from the crimp plate 150, tether 254 passes through a hole 256 in the base plate 42.

An SMA member 260A is mounted at one end to the crimp plate 150, passes through a hole 264 in the base plate 42, engages a bearing 268, and is mounted at the other end to pawl 230A. Bearing 268 is rotatably connected to the base plate 42 by bearing carriage 272A. When the pawl 230A is in the engaged position, the SMA member 260A is characterized by tensile strain, and is thus longer than its predetermined length. Heating the member 260A to its hot state causes the member 260A to decrease in length to its predetermined length, thereby rotating the pawl 230A about axis A2 to its disengaged position and inducing tensile elastic strain in the spring 246A. When the member 260A cools to its cold state, the modulus and yield strength of the member 260A are sufficiently low so that force exerted by the spring 246A is sufficient to deform the member 260A and return the pawl 230A to its engaged position.

Pawl 230B is similarly biased toward its engaged position by a spring 246B. An SMA member 260B is mounted at one end to the crimp plate 150, engages a bearing 268 rotatably connected to the base plate 42 by bearing carriage 272B, and is mounted at the other end to pawl 230B. When the pawl 230B is in the engaged position, the SMA member 260B is characterized by tensile strain, and is thus longer than its predetermined length. Heating the member 260B to its hot state causes the member 260B to decrease in length to its predetermined length, thereby rotating the pawl 230B to its disengaged position and inducing tensile elastic strain in the spring 246B that biases the pawl 230B toward its engaged position. When the member 260B cools to its cold state, the modulus and yield strength of the member 260B are sufficiently low so that force exerted by the spring 246B is sufficient to deform the member 260B and return the pawl 230B to its engaged position.

Referring to FIG. 11, member 298 defines surface 300. Member 298 is representative of the rack 167, and surface 300 is representative of surfaces 168A, 168B of rack 167. Surface 300 is characterized by a plurality of teeth 304, each defined by a respective surface 308 that is perpendicular to the direction of translation of the rack 167, and a respective surface 312 that is angled relative to the direction of translation of the rack 167.

Member 314 defines surface 316. Member 314 is representative of pawls 178A, 178B, 230A, 230B, and surface 316 is representative of the surfaces of the pawls that contact surfaces 168A, 168B when the pawls 178A, 178B, 230A, 230B are in their respective engaged positions. Surface 316 is characterized by a plurality of teeth 320, each being defined by a respective surface 324 that is perpendicular to the direction of translation of the rack 167 and a respective surface 328 that is angled relative to the direction of translation of the rack 167. Thus, when surface 316 is in contact with surface 300, each of surfaces 324 contacts a respective one of surfaces 308, and each of surfaces 324 contacts a respective one of surfaces 312. Downward force is transmissible from the member 314 to the member 298 via surfaces 308, 324; similarly, an upward force is transmissible from the member 298 to member 314 via surfaces 308, 324. Thus, relative movement of the member 298 upward with respect to member 314 is not permitted by surfaces 308, 324, and relative movement of the rack 167 upward with respect to the pawls 178A, 178B, 230A, 230B is not permitted.

However, movement of the member 298 downward results in surfaces 312 exerting a force on surfaces 328 that has a component ("outward component") normal to the downward direction, urging the member 314 away from member 298. If the outward component is sufficient to overcome the biasing of the springs that urge the pawls into their engaged positions, then the pawls 178A, 178B, 230A, 230B will ratchet, i.e., pivot out of engagement with surfaces 168A, 168B. Accordingly, downward movement of the rack 167 with respect to the pawls 178A, 178B, 230A, 230B may occur during pawl engagement with the rack.

The rack 167 and the pawls 178A, 178B, 230A, 230B are characterized by teeth in the embodiment depicted such that engagement of the pawls with the surfaces 168A, 168B prevents movement of the pawls relative to the rack in one direction and permits movement of the pawls relative to the rack in the another direction. It should be noted that other configurations to achieve this functionality may be employed within the scope of the claimed invention. For example, the pawls 178A, 178B, 230A, 230B and the rack surfaces 168A, 168B may employ friction instead of teeth.

Referring again to FIG. 1, the actuator assembly is shown in an armed configuration in which the extension member 36 is in a retracted position, with the bottom plate 34 retained to the latch block 58 by the latch plate 70, and in which the base plate is retained within the annular member 114 by latches 130A, 130B. The spring 50 is compressed and exerts a downward force on the base plate 42 and an upward force on the top plate 30. The top plate 30 is rigidly connected to the bottom plate 34 by the posts 38, and thus the latch plate 70 prevents upward movement of the top plate 30. Referring to FIGS. 1 and 6, the latches 130A, 130B are in their respective engaged positions in which they contact the base plate 42 between the separator bars 78A, 78B, thereby locking the base plate 42 in the cylindrical space 122 of the annular member 114, and preventing the downward movement of the base plate 42 along the posts 38. The rack 167 is in a retracted position with respect to the reset subsystem 26 such that the bottom end 350 of the rack 167 is adjacent the lower pawls 230A, 230B.

Heating members 94A, 94B to the hot state causes the members 94A, 94B to move the latch plate 70 to its unlatched position, thereby permitting the bottom plate 34, and therefore the posts 38 and the top plate 30 (i.e., the extension member), to move upward to an extended position as a result of the upward force exerted by the spring 50 on the top plate 30, as shown in FIG. 12. The energy stored in the spring 50 may thus be employed to move an object that is operatively connected to the top plate 30. The posts 38 slide through the holes 46 formed in the base plate 42 so that the bottom plate 34 is adjacent the base plate 42. The spring 50 is decompressed when the extension member 36 is in the extended position; that is, the distance between the base plate 42 and the top plate 30 has been increased sufficiently from the armed state to enable the spring 50 to decompress. The spring 50, acting on the base plate 42 and the top plate 30, prevents the extension member 36 from moving downward from its extended position. The base plate 42 is retained in its position within the annular member 114 by the latches 130A, 130B.

Referring to FIGS. 13 and 14, heating members 134A, 134B will cause the latches 130A, 130B to rotate to their respective unlatched positions, thereby enabling the base plate 42, and therefore the extension member 36, to move downward, as shown in FIG. 14, until the post (shown at 74 in FIG. 4) engages the latch plate (shown at 70 in FIGS. 3 and 4), securing the extension member 36 in the position shown in FIGS. 1 and 14. More specifically, the cone-shaped tip of the post 74 pushes aside the latch plate 70, and when the slot 78 passes by the latch plate 70, the latch reset springs 102 urge the latch plate 70 into the slot 78.

For the actuator assembly 10 to be returned to the armed state, the base plate 42 must be raised above the latches 130A, 130B to recompress the spring 50. The reset subsystem 26 is configured to raise the base plate 42, thereby compressing the spring 50, after the pin 74 on the bottom plate 34 has reengaged the latch plate 70. When the base plate 42 is in the position shown in FIG. 14, the bottom end 350 of the rack 167 is in contact with the bottom plate 34. FIGS. 15-18 depict sequential operation of the reset subsystem 26 in raising the base plate 42 to its position within the annular member 114.

Referring to FIG. 15, the reset subsystem 26 is depicted with the upper and lower pawls in their respective engaged positions, and with the rack 167 in contact with the bottom plate 34. Referring to FIG. 16, heating SMA member 222 to its hot state causes it to decrease in length to its predetermined length, thereby exerting a downward force on the carriage member 158 and an upward force on the base plate 42. In turn, the pawls 178A, 178B, which are mounted to the carriage member 158 and which are in their engaged positions, transmit downward force to the rack 167. Thus, the carriage member 158, pawls 178A, 178B, and rack 167 move downward relative to the base plate 42. Pawls 230A, 230B passively ratchet, permitting relative movement between the rack 167 and the base plate 42.

Referring to FIG. 17, as the SMA member 222 cools to its cold state, the reset springs 206 urge the carriage member 158, and therefore the pawls 178A, 178B, upward relative to the base plate 42, thereby elongating member 222. The upper pawls 178A, 178B passively ratchet, permitting relative movement between the carriage member 158 and the rack 167. The lower pawls 230A, 230B do not permit relative movement between the base plate 42 and the rack 167. Thus, the carriage member 158 moves upward relative to the rack 167 and the base plate 42.

As shown in FIG. 18, once the spring 206 returns to its unstressed state, the rack 167 is lower, relative to the base plate 42, than its position in FIG. 15. It should be noted that, since downward movement of the rack 167 is prevented by the bottom plate 34, the steps depicted in FIGS. 15-18 have raised the base plate 42. The steps of FIGS. 15-18 are repeated until the base plate 42 engages the latches shown at 130A, 130B in FIG. 1, which then prevent downward movement of the base plate 42. As the base plate 42 is raised, it recompresses the spring shown at 50 in FIG. 1.

Figure 23:
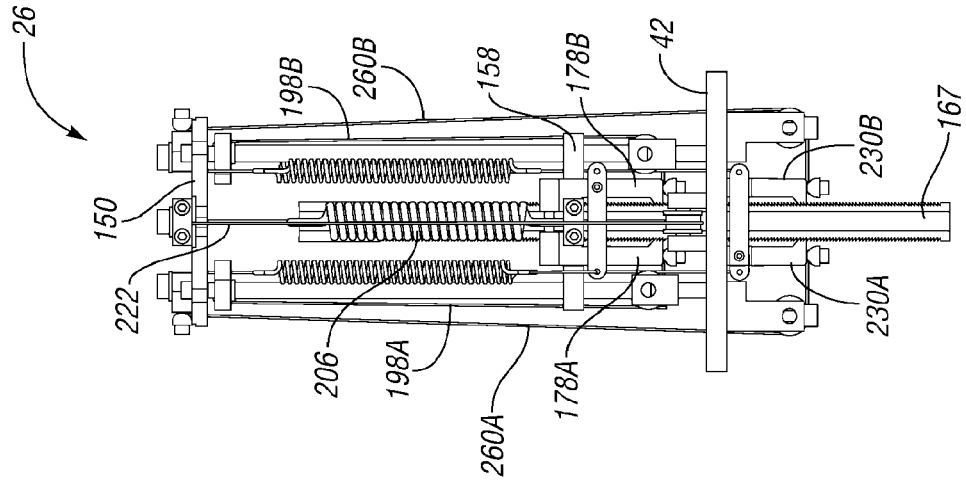
FIG. 23 is a schematic, side view of the ratchet reset mechanism of FIG. 7 with the ratchet member in the second position with respect to the base member, and the lower pawls disengaging from the rack.
Figure 24:
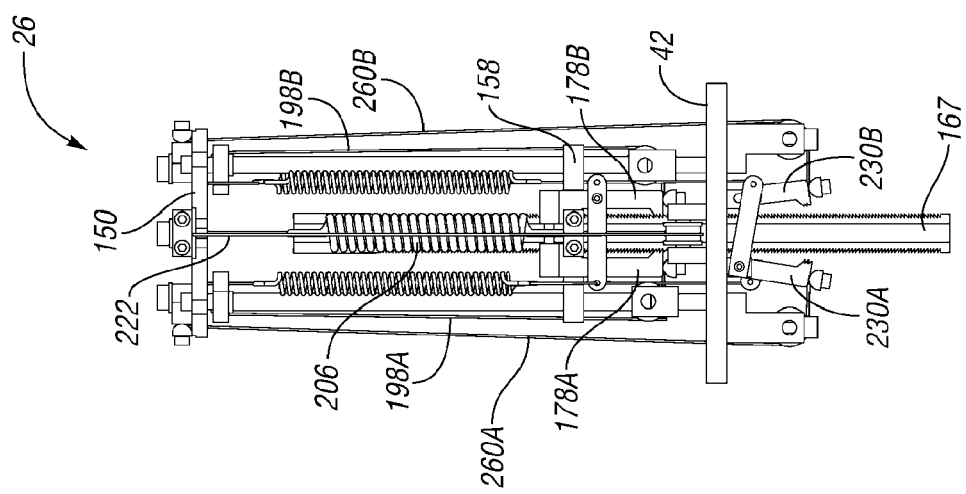
FIG. 24 is a schematic, side view of the ratchet reset mechanism of FIG. 7 with the ratchet member moving to the first position from the second position, with the lower pawls disengaged from the rack.
Figure 25:
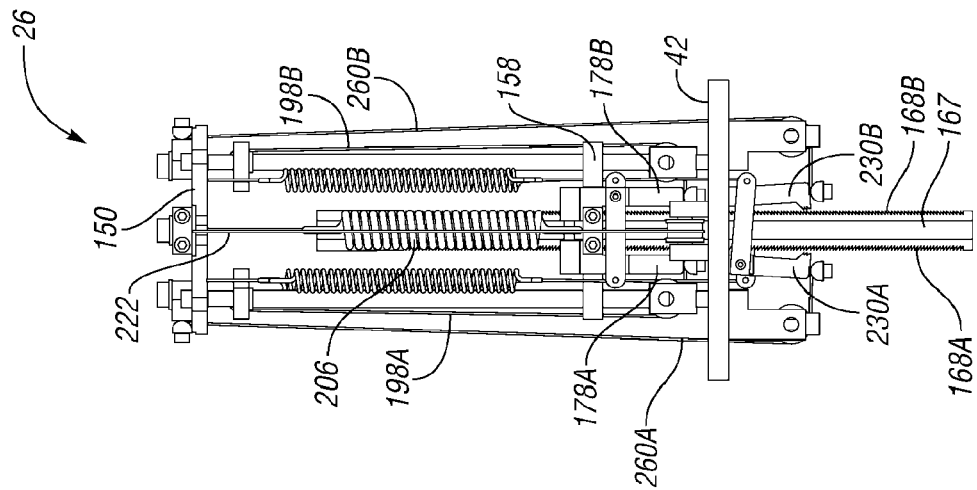
FIG. 25 is a schematic, side view of the ratchet reset mechanism of FIG. 7 with the rack moved from its position shown in FIG. 19 as a result of the movements depicted in FIGS. 20-24.

Once the base plate 42 is latched, the rack 167 is raised to the retracted position shown in FIG. 7. FIGS. 19-25 sequentially depict the steps performed by the reset subsystem 26 to raise the rack 167. Referring to FIG. 19, the reset subsystem 26 is depicted with the upper and lower pawls engaged. Referring to FIG. 20, the upper pawls 178A, 178B are moved to their disengaged position by heating members 198A, 198B to their hot state. When the pawls 178A, 178B are disengaged, member 222 is heated to its hot state to draw the carriage member 158 toward the base plate 42, as shown in FIG. 21. When the carriage member 158 is adjacent the base plate 42, the SMA members 198A, 198B are cooled so that the pawls 178A, 178B return to their engaged positions, as shown in FIG. 22. Then, as shown in FIG. 23, the SMA members 260A, 260B are heated to their hot state so that the pawls 230A, 230B are moved to their disengaged positions. While the pawls 230A, 230B are disengaged, the SMA member 222 is cooled so that spring 206 urges the carriage member 158 upward, drawing the rack 167 upward via the pawls 178A, 178B, as shown in FIG. 24. After the rack 167 is drawn upward, and spring 206 returns to its unstressed state, members 260A, 260B cool so that the pawls 230A, 230B return to their engaged positions, as shown in FIG. 25. Thus, the rack 167 is higher relative to the base plate 42 in FIG. 25 than in FIG. 19. The steps depicted in FIGS. 20-25 are repeated until the rack 167 is raised to its retracted position, as shown in FIG. 7.

The reset subsystem 26 is also operable to dissipate energy stored in the spring 50 when the actuator assembly 10 is in the armed state, e.g., to perform service on actuator assembly 10. To dissipate the energy in the spring 50, the base plate 42 is gradually lowered toward the bottom plate 34 to enable the spring 50 to expand. First, the members 198A, 198B, 260A, 260B are heated to their hot state so that all of the pawls 178A, 178B, 230A, 230B are moved to their disengaged positions, thereby allowing the rack 167 to freely drop until the bottom 350 of the rack 167 contacts the bottom plate 34. SMA members 260A, 260B are then allowed to cool to their cold states so that the pawls 230A, 230B engage the rack 167; simultaneously, members 198A, 198B remain in their hot state so that pawls 178A, 178B remain disengaged from the rack 167, as shown in FIG. 20. Then, latches 130A, 130B are released by heating members 134A, 134B, thus releasing base plate 42; however, pawls 230A, 230B, through their engagement with the rack 167, prevent spring 50 from moving the base plate 42 downward. That is, the pawls 230A, 230B transfer the load from the spring 50 to the rack 167, which transfers the load to the bottom plate 34.

With the upper pawls 178A, 178B still disengaged, member 222 is heated to its hot state, thereby moving the carriage member 158, and the pawls 178A, 178B, downward toward the base plate 42, as shown in FIG. 21. With the member 222 heated, the members 198A, 198B are allowed to cool so that the upper pawls 178A, 178B engage the rack 167, as shown in FIG. 22. After the upper pawls 178A, 178B engage the rack 167, members 260A, 260B are heated so that the lower pawls 230A, 230B disengage the rack 167, as shown in FIG. 23, which transfers the load from the spring 50 to the upper pawls 178A, 178B. With the lower pawls 230A, 230B disengaged, SMA member 222 is allowed to cool to its cold state and the reset springs 206 pull the carriage member 158, upper pawls 178A, 178B, and rack 167 upward, as shown in FIG. 24, thereby allowing the spring 50 to expand a small amount. It should be noted that the upper pawls 178A, 178B maintain engagement with surfaces 168A, 168B, instead of ratcheting, because surfaces 308 and 328 (shown in FIG. 11) are configured such that, in the absence of the restraining force of the lower pawls 230A, 230B on the rack 167, there is an insufficient outward reaction force on the pawls 178A, 178B to overcome the bias of springs 186A, 186B. Accordingly, the pawls 178A, 178B move the rack 167 upward. Members 260A, 260B are then allowed to cool so that the load of the spring 50 is transmitted to the lower pawls 230A, 230B, as shown in FIG. 25. These steps are repeated until the base plate 42 is adjacent the bottom plate 34 and the spring 50 is decompressed.

It should be noted that, although shape memory alloys are employed herein, other active materials may be employed within the scope of the claimed invention, such as electroactive polymers, piezoelectric materials, and magnetostrictive and electrostrictive materials.

Heating of the SMA members may be achieved by electrical resistance heating controlled by an electronic controller (not shown) that is programmed to cause the actuator assembly 10 and its subsystems to perform as described herein. Exemplary SMA members include wires or sets of wires. It may be desirable for a flexible SMA member to comprise a plurality of wires rather than a single wire so that the SMA member is sufficiently flexible to bend at the bearings.

While the best modes for carrying out the invention have been described in detail, those familiar with the art to which this invention relates will recognize various alternative designs and embodiments for practicing the invention within the scope of the appended claims.

The invention claimed is:

1. An actuator assembly comprising:
  a frame;
  an extension member that has a first end and a second end and that is selectively movable with respect to the frame between a retracted position and an extended position;
  a base member that is operatively connected to the extension member for selective translation with respect to the extension member, and that is selectively movable between a first position and a second position with respect to the frame;
  a first latch configured to selectively engage the second end of the extension member to retain the extension member in the retracted position with respect to the frame;
  a second latch configured to selectively engage the base member to retain the base member in the first position with respect to the frame;
  a first spring between the first end of the extension member and the base member, said first spring being compressed and urging the first end and the base member apart when the extension member is in the retracted position and the base member is in the first position;
  said actuator assembly being selectively movable between a first configuration in which the extension member is in the retracted position and the base member is in the first position, a second configuration in which the extension member is in the extended position and the base member is in the first position, and a third configuration in which the extension member is in the retracted position and the base member is in the second position; and a ratchet mechanism configured to selectively move the actuator from the third configuration to the first configuration by moving the base member from the second position to the first position.

2. The actuator assembly of claim 1, wherein the ratchet mechanism includes a rack being selectively movable with respect to the base member in first and second directions and having a surface;

a ratchet member being selectively movable in the first and second directions with respect to the base member;

a first pawl being mounted with respect to the base member for movement therewith in the first and second directions, and being biased into engagement with the surface of the rack; said first pawl and said rack being configured such that engagement of the first pawl with the surface prevents movement of the first pawl relative to the rack in the first direction and permits movement of the first pawl relative to the rack in the second direction; and a second pawl being mounted with respect to the ratchet member for movement therewith in the first and second directions, the second pawl being biased into engagement with the surface of the rack; said second pawl and said rack being configured such that engagement of the second pawl with the surface prevents movement of the second pawl relative to the rack in the first direction and permits movement of the second pawl relative to the rack in the second direction.

3. The actuator assembly of claim 1, further comprising a second spring being operatively connected to the ratchet member and configured to bias the ratchet member in a first position relative to the base member; and a first active-material actuator being operatively connected to the ratchet member and configured to selectively move the ratchet member in the first direction to a second position relative to the base member.

4. The ratchet apparatus of claim 3, wherein the active material is one of a shape memory alloy, a shape memory polymer, an electroactive polymer, a piezoelectric material, a magnetostrictive material, and an electrostrictive material.

5. The ratchet apparatus of claim 3, wherein the first pawl is selectively movable out of engagement with the surface of the rack; and wherein the second pawl is selectively movable out of engagement with the rack.

6. The ratchet apparatus of claim 5, further comprising a third spring biasing the first pawl into engagement with the surface of the rack;

a second active material actuator configured to selectively move the first pawl out of engagement with the surface of the rack;

a fourth spring biasing the second pawl into engagement with the surface of the rack; and a third active material actuator configured to selectively move the second pawl of out engagement with the surface of the rack.

7. The ratchet apparatus of claim 6, wherein the active material is one of a shape memory alloy, a shape memory polymer, an electroactive polymer, a piezoelectric material, a magnetostrictive material, and an electrostrictive material.

* * * * *